UNITED STATES PATENT OFFICE.

HANS REINDEL, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

AZO DYES.

1,126,656. Specification of Letters Patent. Patented Jan. 26, 1915.

No Drawing. Application filed June 30, 1913. Serial No. 776,560.

*To all whom it may concern:*

Be it known that I, HANS REINDEL, citizen of the German Empire, residing at Ludwigshafen-on-the-Rhine, Germany, have invented new and useful Improvements in Azo Dyes, of which the following is a specification.

I have discovered valuable new azo dyes which I can obtain from one molecular proportion of a tetrazotized para-diamin, one molecular proportion of a phenol meta-sulfonic body containing hydrogen in the para position to the hydroxyl group and one molecular proportion of any other azo component including for instance, such compounds as phenol, a cresol, 2.5-amino-naphthol-7-sulfonic acid, 2.8-amino-naphthol-6-sulfonic acid (acid coupling), and also a monoazo compound, for instance such as those obtained by combining a diazotized amin with 1.8-amino-naphthol-mono- or di-sulfonic acid in the presence of acid. As instances of para-diamins which can be employed according to my invention, I mention benzidin, ortho-tolidin, and para-para'-diamino-diphenyl-urea.

My new coloring matters are, in the form of their alkali salts, soluble in water, possess very pure shades and are particularly suitable for dyeing substantively cotton and also paper pulp which is free from wood. On moderate reduction with stannous chlorid and hydrochloric acid, they give rise to a para-diamin, an amino-phenol-meta-sulfonic acid body and at least one other azo component.

The following examples will serve to illustrate further the nature of my invention and how it can be carried into practical effect, but the invention is not confined to these examples. The parts are by weight.

Example 1: Diazotize 18.4 parts of benzidin, at from 0° to 5° C., with 13.8 parts of sodium nitrite in the presence of a slight excess of hydrochloric acid. Then add, gradually, to the tetrazo solution, while maintaining the same temperature, a solution containing 19.6 parts of the sodium salt of phenol-meta-sulfonic acid and 30 parts of calcined soda in about 400 parts of water. After stirring for a short time, the formation of the intermediate compound is complete. Then add a solution containing 25 parts of 2.5-amino-naphthol-7-sulfonic acid dissolved in soda and also containing a further 30 parts of calcined soda. Stir for several hours, salt out the coloring matter, filter it off in the press and dry it. It dyes cotton and also paper which is free from wood clear red shades.

Example 2: Tetrazotize 24.2 parts of para-para'-diamino-diphenyl-urea and add an alkaline solution containing sufficient phenol-meta-sulfonic acid to form the intermediate compound. Stir for several hours and then add a solution containing 10 parts of phenol, twelve and a half parts of 35% caustic soda solution and 100 parts of water. Continue stirring for 24 hours and then heat the mass and salt out the coloring matter and press and dry it. It dyes cotton and also paper free from wood greenish yellow shades.

Example 3: Allow a solution containing the intermediate compound obtained by tetrazotizing 24.2 parts of para-para'-diamino-diphenyl-urea and combining with 1 molecular proportion of phenol-meta-sulfonic acid to run into an alkaline solution of the monoazo coloring matter obtainable by combining 14 parts of para-nitranilin with 34.1 parts of 1.8-amino-naphthol-3.6-disulfonic acid in the presence of acid. Stir for 24 hours, then heat and salt out and press and dry the coloring matter, which dyes cotton and also paper free from wood clear green shades.

The following table illustrates the shades obtainable from other coloring matters which can be produced according to this invention:

| Coloring matter from: | Shade. |
|---|---|
| Benzidin ⟨ Phenol-m-sulfonic acid / 2.8-Amino-naphthol-6-sulfonic acid (acid coupling) | Red. |
| o-Tolidin ⟨ Phenol-m-sulfonic acid / 2.5-Amino-naphthol-7-sulfonic acid (alkaline coupling) | Bordeaux red. |
| p-p'-Diamino-diphenyl-urea ⟨ Phenol-m-sulfonic acid / 2.8-Amino-naphthol-6-sulfonic acid (acid coupling) | Scarlet. |
| Benzidin ⟨ 2-Hydroxy-toluene-4-sulfonic acid / 2.5-Amino-naphthol-7-sulfonic acid (alkaline coupling) | Pure red. |
| Benzidin ⟨ Phenol-m-sulfonic acid / 1.8-Amino-naphthol-3.6-disulfonic acid-p-nitranilin | Green. |
| o-Tolidin ⟨ Phenol-m-sulfonic acid / 1.8-Amino-naphthol-3.6-disulfonic acid-p-nitranilin | Green. |

The last two coloring matters of the above table, produced respectively from benzidin and ortho-tolidin, are obtained by combining diazotized para-nitranilin with 1.8-amino-naphthol-3.6-disulfonic acid, in acid solution, and then combining the product so obtained, in alkaline solution, with the intermediate product obtained from the diamin and phenol-meta-sulfonic acid.

Now what I claim is:—

1. The new azo coloring matters obtainable from a tetrazotized para-diamin, one molecular proportion of a phenol-meta-sulfonic acid body containing hydrogen in the para position to the hydroxyl group, and one molecular proportion of any other azo component, which new coloring matters are, in the form of their alkali salts, soluble in water, dye cotton substantively very pure shades and upon moderate reduction with stannous chlorid and hydrochloric acid give rise to a para-diamin, an amino-phenol-meta-sulfonic acid body and at least one other azo component.

2. The new azo coloring matter obtainable by combining one molecular proportion of tetrazotized benzidin with one molecular proportion of phenol meta-sulfonic acid and, in alkaline solution, with one molecular proportion of 2.5-amino-naphthol-7-sulfonic acid, which coloring matter, in the form of its sodium salt, is soluble in water and dyes cotton clear red shades and, upon reduction with stannous chlorid and hydrochloric acid gives rise to benzidin, amino-phenol-meta-sulfonic acid and an amino derivative of 2.5-amino-naphthol-7-sulfonic acid.

In testimony whereof I have hereunto set my hand in the presence of two subscribing witnesses.

HANS REINDEL.

Witnesses:
J. ALEC. LLOYD,
JOSEPH PFEIFFER.